United States Patent Office 2,770,840
Patented Nov. 20, 1956

2,770,840
METHOD FOR PRODUCING MOLDED PRODUCTS COMPRISING MELAMINE FORMALDEHYDE RESIN AND GYPSUM

Lawrence P. Biefeld, Granville, and Richard F. Shannon, Lancaster, Ohio, assignors to Owens-Corning Fiberglas Corporation, Toledo, Ohio, a corporation of Delaware No Drawing. Application April 24, 1952,
Serial No. 284,201

6 Claims. (Cl. 18—47.5)

This invention relates to the art of molding plastic compositions and it relates particularly to producing molded products of gypsum and melamine formaldehyde resin reinforced with glass fibers.

Molding compositions of urea formaldehyde or melamine formaldehyde resinous materials and gypsum have been proposed by others but such compositions generally have required the use of long molding cycles to develop the desired cure and were impractical from an economical as well as from the engineering standpoint. In the past, compositions based upon urea or melamine formaldehyde resin forming materials and gypsum cement have required not less than 20 to 30 minutes and often hours for cure at temperatures within the range permissible for gypsum cements. In order to be acceptable for commercial practice, it is important to seek to embody a number of characteristics in molding compositions of the type described. Some of these characteristics have not been available under any circumstances while others have been in conflict with each other so that improvement of one has resulted in decrease of another and so on. For example, it is desirable to produce a molding composition having good shelf or pot life—that is, it should be capable of being mixed while still having sufficient flow for molding for a reasonable length of time thereafter. The need for good pot life must be balanced with the contrasting characteristic of rapid cure under molding conditions. In addition, molding compositions of the type described should be capable of flow sufficient to fill the mold without such separation of the ingredients as would produce an inferior or unusable molded product.

It has been found that products molded of malamine or urea formaldehyde and gypsum cement remain substantially brittle even when substantial amounts of organic resin are present in the molding composition such that the molded products shatter upon slight impact but that, when glass fibers are incorporated in amounts of at least 1 percent by weight and preferably in amounts ranging from 4 to 8 percent by weight, the impact, flexure, tensile and other strength properties are increased as much as nine-fold.

It is an object of this invention to produce a molded product of a glass fiber reinforced gypsum and melamine formaldehyde molding composition.

A further object is to produce a molded product characterized by good appearance, high strengths and which embodies the characteristics desired in a cementitious composition, such as good moisture resistance, good weathering properties, high electrical and heat resistance, non-inflammability and the like.

A still further object is to produce an improved product of any desired shape and wall thickness without tying up molding equipment for use in extensive molding cycles and without sacrifice of dimensional stability, strength and curing characteristics of the components.

A still further object is to produce a new and improved cementitious molded product of high strength.

As used herein, the term "molding" is intended to include casting wherever possible although under the conditions existing, force of a relatively high order is required to effect flow of the desired character during molding operations.

Briefly described, a molding compound embodying flow of the desired character coupled with rapid cure while still having good pot life may be compounded in accordance with the practice of this invention of alpha-gypsum cement and a melamine formaldehyde resin forming material with water present in amounts sufficient to satisfy the combined water for the cured gypsum cement and impart flow of the desired character and including catalytic agents to accelerate and effect the substantially simultaneous cure of both the melamine component and the alpha-gypsum cement. Use is also made in compositions embodying features of this invention of a retarder for the alpha-gypsum cement in amounts balanced with the catalytic agents and basic ingredients to provide for good pot life without harmfully affecting or unduly lengthening the rate of cure or the manner of cure of the ingredients. This balance of conflicting properties characteristic with most cementitious compounds has been achieved in the molding composition embodying features of this invention by the use of materials in a new and novel manner and in a ratio to produce the desired results.

For a better understanding of the invention, an example of a molding compound and its method of use will now be given. It should be understood however that this example is given solely by way of illustration, and not by way of limitation:

EXAMPLE 1

Composition 100 parts alpha-gypsum cement (Industrial White Hydrocal)
25 parts melamine formaldehyde water soluble resin (Melmac 405—American Cyanamid Co.)
18 parts water
1 part zinc stearate
0.5 part retarder (Red Top)
2.5 parts sodium hydrogen sulphate
7.5 parts glass fibers The amounts specified above are in parts by weight. The order in which the materials are combined to prepare the molding compound is not critical but it is preferred to dissolve the melamine formaldehyde resin in an intermediate stage of polymeric growth in the major proportion of the water and to dissolve the sodium hydrogen sulphate in the remainder. The solution of sodium hydrogen sulphate is adapted to receive the Red Top retarder and then to be mixed into the solution of the melamine formaldehyde resin.

The zinc stearate is first combined as a powder with the industrial white Hydrocal and the mixture is combined with the resin solution and worked together until a smooth paste is formed.

In order to prevent balling of the glass fibers, it is best to add the glass fibers last by hand and then employ a mechanical mixer, such as a dough mixer or W & P mixer to work and to distribute the glass fibers uniformly through the molding compound.

EXAMPLE 2

Molding

Before the molding composition has set to the point where flow of the desired character is no longer available, the amount of molding compound for charging the mold cavity is formed into a compact mass or ball and fed directly into the molding space. The mold parts are actuated into molding relation under a pressure ranging from 500 to 4000 pounds per square inch or more, depending upon the force necessary to cause the material to flow and fill the mold cavity. While the rate of cure of the molding composition does not appear to be a function of pressure, the density is increased with greater pressure and the strength properties of the resulting molded product are also increased but not in proportion to density. The glass fibers, when incorporated in the amounts which will hereinafter be more specifically described, remain uniformly distributed with the cementitious and resinous mixture during flow under molding conditions so as to remain uniformly distributed throughout the molded product as compared to separations of the type which have heretofore occurred in the molding of such compounds to produce areas of low fiber concentration and areas of high fiber concentration where flow has not occurred.

Molding temperatures in the range of 220° to 300° are preferred. At temperatures below 212°, the curing rate of the ingredients is greatly lengthened while the temperature in the upper range is limited by the overcure of the organic resinous component and the effect of temperature on the dehydration of the molded product to eliminate the necessary water for cure. At 250° F. the molding composition of Example 1 may be cured in about 1 minute. Its pot life, measured from the time that the gypsum is incorporated into the resinous solution, is from 60 to 180 minutes. Thus it is desirable to compound only so much of the molding composition as can be safely utilized within the time span for good flow.

EXAMPLE 3

*Hydration*

Under the conditions for molding described in Example 2, the material has taken a permanent set but full strength of the molded product has not been developed. In fact, the molded product is quite flexible and rubbery and in wall thicknesses of about ⅛ inch may have a strength of about 4000 pounds per square inch. It has been found that the molded product may be removed from the mold parts under these conditions and the product converted to a hard stage and its strength more than doubled by hydration. In order to advance the cure and develop high strength properties, the molded product is subjected almost immediately after molding to a hydration step wherein the molded product is placed in contact with moisture for a number of hours.

Mere exposure of the molded product to high humidity conditions, such as 85 to 95 percent humidity and at temperatures ranging up to 120° F. has been found ineffective for developing full strength in an economical manner. Hydration may be carried out by complete immersion of the molded product in water for about 8 or more hours. Immersion in water for 20 to 30 minutes has little, if any, effect. While some hardening takes place after immersion for 8 hours, the molded product becomes extremely hard and full strength is developed when immersed in water for 24 hours or more. Exposure to conditions where moisture condenses on the surface appears to be even more desirable than immersion. For example, best results are secured when the molded product is exposed after molding to 100 percent humidity at temperatures which may range from room temperature up to 100° to 120° F.

During molding it appears that a film of moisture is squeezed or otherwise formed under pressure on the outer surfaces of the molded product but that upon release of pressure the moisture layer is drawn into the interior of the molded product to supply the water necessary for satisfying the reaction of the cement. The water of condensation released by the curing reaction of the melamine formaldehyde resin is also absorbed by the gypsum during conversion to a cured compound. As a result, molding operations to release gases and vapors during the molding cycle do not pose problems in the practice of this invention.

As previously pointed out, the amount of water incorporated into the molding composition corresponds generally to that which is theoretically required to combine with the gypsum in cure. When an excess is present, blistering and bubbling occurs upon release of the mold pressure and the cure is also undesirably lengthened. Less than the theoretical amount of water may be used, taking into consideration also the amount of water released from the resinous cure of the melamine formaldehyde component. However, an amount of water at least sufficient to impart flow of the desired character must be used. Theoretically 18.6 parts of water combine with 100 parts of gypsum. As little as 16 to 17 parts water may be used while still securing flow of the desired character. If less is used, it must be replaced by absorption of additional water for cure during the hydration step.

The type of gypsum cement is not important but it is desirable to make use of a cement ground to fine particle size, such as 200 mesh or less, and one which either forms a neutral slurry with water or provides a pH slightly on the acid side, such as a pH of about 6 or 7 in order to remain stable while supplying the acidic properties necessary for cure of the melamine formaldehyde component. Industrial white Hydrocal, manufactured by the U. S. Gypsum Company, is representative of a cement which may be used in the practice of this invention.

The strength properties of the molded product and the conditions for cure of the molding composition are dependent in part upon the melamine formaldehyde resinous component and the amount thereof. When the amount of water soluble melamine formaldehyde resin falls below a ratio of one part by weight thereof to 4 parts by weight gypsum, the strength properties of the molded product begins to drop off yet a good molded product can be secured when present in the ratio or one part by weight melamine formaldehyde resin to 8 parts by weight gypsum cement. Lowering the ratio of melamine to gypsum also seems to increase the cure time of the molding composition, though when used within the range prescribed, the curing rate is not lengthened to an impractical value. The upper limit of concentration between the melamine formaldehyde resin and gypsum cement is determined principally by economical factors because the strength properties of the molded product are not increased in proportion to the increase of resin, yet the cost factors are materially affected and makes a ratio greater than one part by weight resin to two parts by weight gypsum impractical.

Urea formaldehyde resin may not be successfully substituted for the melamine formaldehyde resin in the practice of this invention. It appears that the conditions for reaction are substantially dissimilar and requires a different system with respect to ingredients and methods of molding to achieve the desired balance in reactions and to produce a satisfactory molded product. Different requirements exist with respect to accelerators, retarders, and molding steps for the production of molded products.

The sodium hydrogen sulphate performs a dual function in the composition of Example 1. It operates to seed and accelerate the setting reaction of the gypsum cement and in that function it may be substituted, in whole or in part, with other water soluble substantially neutral salts such as sodium chloride, sodium sulphate, sodium carbonate, sodium phosphate, potassium chloride, potassium sulphate or other alkali metal water insoluble inorganic or organo metallic salts such as sodium acetate, sodium formate, sodium lactate and the like. Water soluble alkali metal salts of the type described to seed and accelerate the gypsum cure should be present, for best results, in amounts in excess of 1 percent by weight based upon gypsum but it is preferred to maintain the concentration within the range of ½ to 2½ percent by weight if used solely to seed reaction or from ½ to 4 percent by weight if it functions in the dual capacity of lowering pH as will hereinafter be described.

For cure of the melamine formaldehyde resinous component, it is necessary to adjust the pH of the composition to above 5 but below 7. The sodium hydrogen sulphate used as an accelerator for gypsum also functions, as previously described, to lower the pH of the molding composition. Other acidic salts capable of the dual function of seeding the gypsum cement and adjustment of pH to a range desired for the cure of the resinous component may be used. In the event that the water soluble salt for seeding the gypsum reaction is neutral in character, other acidifying substances such as water soluble salts formed of a strong acid and weak base may be used, such as zinc chloride, ammonium chloride, aluminum chloride, iron chloride of the like, or organic acids of the type phthalic acid, benzoic acid, boric acid and the like. Use may be made of small amounts of inorganic acids such as hydrochloric acid. When inorganic acids are used the amount may range from 0.25 to 1½ percent by weight. ½ to 2 percent by weight inorganic salts and up to 10 percent by weight of organic acids may be required in order to balance the cure of the resinous component so as to proceed conjointly with the setting of the gypsum cement, otherwise the ingredients become segregated one from the other to produce a non-uniform and undesirable molded product.

The amount of retarder for the gypsum has been found to be quite critical. It is desirable to embody a concentration of retarder which provides for reasonable pot life without materially affecting the curing rate of the cement or the resinous component under molding conditions. If less retarder is used, the cement begins to set up before all of the molding composition prepared has been utilized. As a result, it is difficult to secure flow sufficient to fill the mold with the latter portions of the batch and variations result throughout in the molded product to the end that some of the batch is wasted and a non-uniform molded product results. On the other hand, if the amount of retarder is in excess of that necessary to give the desired pot life, when balanced with the accelerator and resinous content of the molded composition, the cure of the molded product is materially affected and it is difficult to secure conversion to a necessary set stage within reasonable time. When the retarder is of the type generally known as hydrolyzed keratin (split between its sulphite linkages with alkali) which is absorbed in the lime, as marketed under the trade name "Red Top Retarder" by the U. S. Gypsum Company, amounts within the range of 0.25 to 0.75 percent by weight, based upon the amount of cement, may be used. If 1 percent of the retarder is introduced into the composition, advancement of the molding composition to set stage will require 3–10 minutes even at elevated temperature. It will be understood that other retarders available, such as potassium citrate, may be substituted for the Red Top retarder described but the amount used should be in proportion to their activity as compared thereto. When used in the amounts described, the pot life of the molding composition may extend from 1 to 7 hours depending upon the atmospheric conditions or the protection under which the composition is stored. Under equivalent conditions, the pot life will drop on warm days and will lengthen on cold days. High humidity or packaging in a moisture impervious film in order to prevent evaporation of moisture from the molding composition will materially extend the pot life while conditions which enhance moisture loss will lessen pot life.

It is desirable to incorporate as much glass fiber as possible consistent with the ability to distribute the fibers, feed the mold cavity and secure flow of the desired character. While the addition of glass fibers has little, if any, effect on the balance between cure of the resinous and cementitious components and the balance between accelerator and retarder for control of the gypsum cement, it does have some effect on the flow properties and markedly increases the strength of the molded product. As little as 1 percent by weight glass fibers of reinforcing length are sufficient in most instances to at least double the strength properties of the molded product compared to a product molded under similar conditions without glass fibers.

A product which shatters readily under slight impact without glass fiber reinforcement may be provided with strengths in excess of 9000 pounds per square inch when 4 percent glass fibers are incorporated directly into the molding composition. As much as 8 percent glass fibers may be incorporated and under special conditions for handling and where flow to any great extent is not required, still more glass fibers may be used. Fibers of reinforcing length range from ¼ inch up. Lengths greater than 2 inches may be used but special devices and precautions are necessary properly to distribute the fibers without segregation or balling in the molding composition and the viscosity or flow of the molding compound is somewhat proportionately increased with fiber length. Lengths less than ¼ inch operate more as a filler than as a strengthening agent.

Fibers in various forms may be used for reinforcement. It is preferred to make use of continuous strands of glass fibers cut to short lengths but rovings formed of discontinuous fibers cut to desirable lengths may also be used. Filaments of continuous of discontinuous fibers can be embedded in the molding composition as a molding reinforcement, alone or in composition with cut strands or rovings and glass fiber fabrics cut into pieces no greater than ½ inch may be used where high strength in all directions is required. It is, of course, desirable to be able to incorporate the fibers into the slurry in a manner to secure good fiber distribution as rapidly as possible and by mechanical means. As described in the copending application of Lawrence P. Biefeld and Frank O. Brisley, Serial No. 263,998, filed on December 28, 1951 and entitled "Reinforced Cement Products and Method of Making the Same," the stiffness of the fiber as influenced by its diameter or size applied thereto has noticeable effect upon its ability to be mixed into a slurry of this character without balling. Generally, the stiffer the fiber, the less the difficulty in securing uniform and rapid distribution.

EXAMPLE 4

100 parts calcined gypsum
25 parts melamine formaldehyde water soluble powder
18.5 parts water
½–1 part sodium chloride
1.5 parts hydrochloric acid (½ gram HCl per 100 grams of solution)
0.5 part Red Top Retarder
8.0 parts glass strands cut to ½ inch lengths The materials are combined to form a molding composition as described in Example 1.

The pot life of the composition from the time that the gypsum is mixed into the resin solution is about 4 hours under normal conditions. Panels having a wall thickness of about ⅛ inch may be molded under 1000 pounds per square inch pressure in about 30 seconds at 250° to 275° F. When removed from the mold, the product is somewhat flexible and has a flexural strength on the order of 3500 to 4000 pounds per square inch. After immersion in water for 24 hours at room temperature the molded product becomes hard and has a flexural strength of 8700 to 9000 pounds per square inch, a compressive strength of 11,000 pounds per square inch, a flexure modulus of 2.5, and an impact strength of 3 pounds. The moisture absorption is less than 5 percent.

Additional examples of molding compositions embodying features of this invention are as follows:

EXAMPLE 5

100 parts gypsum cement
25 parts melamine formaldehyde water soluble resin 18 parts water
1 part zinc stearate
0.75 part Red Top Retarder
2.5 parts sodium hydrogen sulphate
5.0 parts glass fibers The formulation hereof corresponds with that of Example 1 except that the amount of retarder is increased to 0.75 part by weight of the cement. The cure time is lengthened from 30 seconds for Example 1 to about one minute for the above composition but the flexure strength still remains at about 8000 pounds per square inch.

EXAMPLE 6

100 parts alpha-gypsum cement
30 parts melamine formaldehyde water soluble resin
18 parts water
1 part zinc stearate
0.5 part retarder
1 part benzoic acid
1 part sodium chloride
2.0 parts glass fiber strands of ½ inch length

EXAMPLE 7

100 parts gypsum cement
20 parts melamine formaldehyde water soluble resin
18.5 parts water
0.5 part retarder
1.0 part ammonium chloride
1.0 part sodium sulphate
4.0 parts glass fiber reinforcement

EXAMPLE 8

100 parts gypsum cement
20 parts melamine formaldehyde resin
18 parts water
1 part aluminum stearate
0.5 part retarder
2.5 parts zinc chloride
1 part sodium carbonate
4.0 parts glass fiber

EXAMPLE 9

100 parts gypsum cement
25 parts melamine formaldehyde water soluble resin
18 parts water
1 part zinc stearate
1.5 parts ferric chloride
0.5 part potassium stearate The zinc stearate is incorporated in the molding composition primarily by way of a lubricant to effect mold release. Instead of incorporating the zinc stearate as an ingredient in the molding composition, the mass of material to be molded may be dusted with zinc stearate or the mold surface may be dusted with zinc stearate or other metallic soap or mold lubricant. Use may also be made of the organo-silicon fluids to secure release of the molded product and use thereof may be made alone or in combination with the metallic soaps or other lubricants incorporated into the molding composition or dusted thereon.

Instead of incorporating the glass fibers as a filler directly into the resinous and gypsum mix to produce a moldable composition of good flow, it is possible to embody the concepts of this invention in a similar system wherein fabrics of glass fibers are embedded within the cementitious-melamine formaldehyde resinous mix to produce a molding composition which is to be subjected to little flow during molding operations and produce a high strength molded product having the characteristics more of a laminate.

In the practice of this phase of the invention compositions corresponding to those illustrated in Examples 1 and 4–8, without glass fibers, may be introduced in whole or in part to the mold surface and fabrics of woven, knitted or bonded glass fibers draped thereon and embedded in the mix by spatula or by other force to secure a uniform distribution of glass fibers across the area. Where glass fibers are desired in some further distribution throughout the thickness of the molded product, it will be convenient to apply a fabric of loosely woven glass fibers between the layers of the cementitious-resinous mix and to permit the layers to become integrated into a composite structure in advance of or during molding.

By this manner of molding, it is possible to introduce more glass fibers, such as amounts ranging up to about 15 to 20 percent by weight of the molded product, because flow of a high order is not required. It is also possible to reduce the amount of water necessary in the molding composition to as little as 12 percent by weight of the gypsum but the deficiency must be made up during subsequent hydration in order to develop full cure and strength.

Other than the manner of adding fibers and the amounts thereof, the conditions described for formulation, molding and hydration still prevail in the production of a glass fiber reinforced molded product of gypsum and melamine formaldehyde resin with the glass fibers embedded in fabric form.

It will be understood that various changes may be made in ingredients, their ratios and their order of combination to provide a molded product capable of use in the practice of this invention and that various modifications may be made in the details of molding and dehydration thereof without departing from the spirit of the invention, especially as defined in the following claims.

We claim:

1. A method for producing molded products comprising loading a mold space with a composition consisting essentially of a water soluble melamine formaldehyde resin in an intermediate stage of polymeric growth and calcined gypsum present in the ratio of 1 part by weight resin to 2–8 parts by weight gypsum, water in amounts greater than 16 parts by weight per 100 parts by weight of gypsum to impart flow of the desired character but not more than that theoretically required to combine with the gypsum to form a cured cement, a water soluble alkali metal salt present in amounts ranging from 0.25–4 parts by weight per 100 parts by weight of gypsum to seed the cement cure, an acidic substance to adjust the pH of the composition to between 5 and 7, a retarder for the gypsum cement, and glass fibers of reinforcing lengths present in amounts ranging from 1–20 percent by weight based upon the solids in the molding composition, molding the composition under heat and pressure between mold surfaces heated to a temperature within the range of 220–300° F. whereby the composition is caused to flow for filling the mold space until the melamine formaldehyde resin and gypsum components are advanced to a stage capable of maintaining mold shape, removing the molded product from the mold space, and hydrating the molded product with a film of water in surface contact with the molded product until said components are converted to a hard and cured stage.

2. A method for producing molded products comprising loading a mold space with a composition consisting essentially of a water soluble melamine formaldehyde resin in an intermediate stage of polymeric growth and calcined gypsum present in the ratio of 1 part by weight resin to 2–8 parts by weight gypsum, water in amounts greater than 16 parts by weight per 100 parts by weight of gypsum to impart flow of the desired character but not more than that theoretically required to combine with the gypsum to form a cured cement, a water soluble alkali metal salt present in amounts ranging from 0.25–4 parts by weight per 100 parts by weight of gypsum to seed the cement cure, an acidic substance to adjust the pH of the composition to between 5 and 7, a retarder for the gypsum cement, and glass fibers of reinforcing lengths present in amounts ranging from 1–20 percent by weight based upon the solids in the molding composition, molding the composition under heat and pressure between mold surfaces heated to a temperature within the range of 220–275° F. to cause the material to flow and fill the mold space, maintaining molding conditions until the material is converted to a stage capable of maintaining shape but less than that for fully curing the resinous and cementitious components thereof, removing the molded product from the mold space, and then hydrating the molded product with a water layer in surface contact therewith until the product is converted to a hard and cured stage.

3. A method for producing molded products comprising loading a mold space with a composition consisting essentially of a water soluble melamine formaldehyde resin in an intermediate stage of polymeric growth and calcined gypsum present in the ratio of 1 part by weight resin to 2–8 parts by weight gypsum, water in amounts greater than 16 parts by weight per 100 parts by weight of gypsum to impart flow of the desired character but not more than that theoretically required to combine with the gypsum to form a cured cement, a water soluble alkali metal salt present in amounts ranging from 0.25–4 parts by weight per 100 parts by weight of gypsum to seed the cement cure, an acidic substance to adjust the pH of the composition to between 5 and 7, a retarder for the gypsum cement, and glass fibers of reinforcing lengths present in amounts ranging from 1–20 percent by weight based upon the solids in the molding composition, molding the composition under heat and pressure between mold surfaces heated to a temperature within the range of 220–275° F., maintaining molding conditions until the material is converted to a stage capable of holding a shape but less than that for fully curing the resinous or cementitious components, removing the molded product from the mold space, and hydrating the molded product with a water layer in surface contact therewith for at least 8 hours.

4. A method for producing molded products comprising loading a mold space with a composition consisting essentially of a melamine formaldehyde resin in an intermediate stage of polymeric growth and calcined gypsum present in the ratio of 1 part by weight resin to 2–8 parts by weight gypsum, water in amounts to impart flow of the desired character but not more than that theoretically required to combine with the gypsum to form a cured cement, an acid salt present in amounts ranging from 0.25–4 parts by weight to 100 parts by weight gypsum to seed the gypsum cure and to adjust the pH of the composition to between 5 and 7, a retarder for the gypsum, and from 1–20 percent by weight glass fibers having a length greater than ¼ inch, molding the composition under heat and pressure between mold surfaces heated to a temperature of 220–300° F. to cause the material to flow and fill the mold space, maintaining molded conditions until the material is converted to a set stage capable of holding a shape but less than that for conversion of the resinous or cementitious components to cured stage, removing the molded product from the mold space, and then hydrating the molded product with a water layer in surface contact therewith until converted to a hard and set stage.

5. A method for producing molded products comprising loading a mold space with a composition consisting essentially of a water soluble melamine formaldehyde resin in an intermediate stage of polymeric growth and calcined gypsum present in the ratio of 1 part by weight resin to 2–8 parts by weight gypsum, water in amounts to impart flow of the desired character but not more than that theoretically required to combine with the gypsum to form a cured cement, a water soluble alkali metal salt present in amounts ranging from 0.25–4 parts by weight per 100 parts by weight of gypsum to seed the cement cure, an acidic substance to adjust the pH of the composition to between 5 and 7, and a retarder for the gypsum cement, applying portions of the slurry onto a mold surface and incorporating glass fibers in fabric form onto the layers of slurry applied to the mold surface, molding the composition under heat and pressure between mold surfaces heated to a temperature of 220–300° F., maintaining molding conditions until the composition is converted to a stage capable of maintaining shape but less than that for conversion of the cementitious or resinous components to a cured stage, removing the molded product from between the mold space and then hydrating the molded product with a water layer in surface contact therewith until the resinous and cementitious components are converted to a cured stage and the product is hardened.

6. A method for producing molded products comprising loading a mold space with a composition consisting essentially of a melamine formaldehyde resin in an intermediate stage of polymeric growth and calcined gypsum present in the ratio of 1 part by weight resin to 2–8 parts by weight gypsum, water in amounts to impart flow of the desired character but not more than that theoretically required to combine with the gypsum to form a cured cement, an acid salt present in amounts ranging from 0.25–4 parts by weight to 100 parts by weight gypsum to seed the gypsum cure and to adjust the pH of the composition to between 5 and 7, and a retarder for the gypsum, applying portions of the slurry onto a mold surface and incorporating glass fibers in fabric form onto the layers of slurry applied to the mold surface, molding the composition under heat and pressure between mold surfaces heated to a temperature of 220–300° F., maintaining molding conditions until the composition is converted to a stage capable of maintaining shape but less than that for conversion of the cementitious or resinous components to a cured stage, removing the molded product from between the mold space, and then hydrating the molded product with a water layer in surface contact therewith until the resinous and cementitious components are converted to a cured stage and the product is hardened.

References Cited in the file of this patent

UNITED STATES PATENTS

| Number | Name | Date |
|---|---|---|
| 1,634,079 | Nishi | June 28, 1927 |
| 1,725,243 | Avery et al. | Aug. 20, 1929 |
| 2,311,613 | Slayter | Feb. 16, 1943 |
| 2,346,999 | Sandford et al. | Apr. 18, 1944 |
| 2,419,440 | Delmonte | Apr. 22, 1947 |
| 2,571,343 | Dailey et al. | Oct. 16, 1951 |
| 2,594,280 | Beaudet | Apr. 29, 1952 |
| 2,664,406 | Armstrong | Dec. 29, 1953 |